United States Patent
Montojo et al.

(10) Patent No.: US 7,411,930 B2
(45) Date of Patent: Aug. 12, 2008

(54) APPARATUS AND METHOD FOR PRIORITIZED APPORTIONMENT OF TRANSMISSION POWER IN A MULTI-CARRIER TERMINAL

(75) Inventors: Juan Montojo, San Diego, CA (US); Naga Bhushan, San Diego, CA (US); Peter John Black, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 876 days.

(21) Appl. No.: 10/739,964

(22) Filed: Dec. 17, 2003

(65) Prior Publication Data

US 2005/0135312 A1   Jun. 23, 2005

(51) Int. Cl.
*H04B 7/216* (2006.01)

(52) U.S. Cl. .................. 370/335; 370/342; 455/91; 455/115.1

(58) Field of Classification Search ............. 370/335, 370/336, 320, 342, 441, 345, 498; 455/91, 455/115.1, 125, 127.1, 127.2
See application file for complete search history.

(56) References Cited

U.S. PATENT DOCUMENTS

| | | | |
|---|---|---|---|
| 5,056,109 A * | 10/1991 | Gilhousen et al. | 370/342 |
| 5,267,262 A | 11/1993 | Wheatley, III | |
| 5,933,781 A | 8/1999 | Willenegger et al. | |
| 6,035,209 A | 3/2000 | Tiedemann, Jr. et al. | |
| 6,101,179 A | 8/2000 | Soliman | |
| 6,545,989 B1 * | 4/2003 | Butler | 370/329 |
| 6,567,478 B2 * | 5/2003 | Oishi et al. | 375/297 |
| 6,609,008 B1 | 8/2003 | Whang et al. | |
| 6,694,148 B1 * | 2/2004 | Frodigh et al. | 455/522 |
| 6,931,240 B2 * | 8/2005 | Hunton | 455/130 |
| 6,937,669 B2 * | 8/2005 | Tomerlin et al. | 375/297 |
| 7,110,727 B2 * | 9/2006 | Dekker | 455/91 |
| 2001/0031014 A1 | 10/2001 | Subramanian et al. | |
| 2003/0069035 A1 * | 4/2003 | Shurvinton | 455/522 |
| 2003/0182612 A1 * | 9/2003 | Tsuchie | 714/755 |
| 2004/0082339 A1 * | 4/2004 | Lee | 455/453 |
| 2004/0109511 A1 * | 6/2004 | Lee | 375/296 |
| 2004/0252786 A1 * | 12/2004 | McHenry | 375/297 |
| 2005/0135312 A1 * | 6/2005 | Montojo et al. | 370/335 |
| 2006/0082413 A1 * | 4/2006 | Shanbhag | 330/149 |
| 2007/0004351 A1 * | 1/2007 | Dekker | 455/127.1 |
| 2007/0147528 A1 * | 6/2007 | Kim et al. | 375/260 |

FOREIGN PATENT DOCUMENTS

| | | |
|---|---|---|
| WO | 0115335 | 3/2001 |
| WO | 02084935 | 10/2002 |

OTHER PUBLICATIONS

International Search Report- PCT/US/04/040164, International Search Authority - -European Patent Office-- Mar. 30, 2005.

* cited by examiner

*Primary Examiner*—Hassan Kizou
*Assistant Examiner*—Mounir Moutaouakil
(74) *Attorney, Agent, or Firm*—D. Scott Juneau; Thomas R. Rouse

(57) ABSTRACT

In a multi-carrier access terminal having a transmitter with a single power amplifier, maximum transmission power available for a multi-carrier signal transmitted by the terminal is apportioned among a plurality of carriers on a priority basis. Following apportionment, the carriers are combined into a multi-carrier signal, amplified by the power amplifier and transmitted.

21 Claims, 5 Drawing Sheets

APPARATUS AND METHOD FOR PRIORITIZED APPORTIONMENT OF TRANSMISSION POWER IN A MULTI-CARRIER TERMINAL

BACKGROUND

1. Field

The present invention relates generally to telecommunications, and more specifically, to multi-carrier communications.

2. Background

In wireless communication systems, dual-carrier or multi-carrier terminals are increasingly being used for simultaneously carrying voice traffic and non-voice data traffic. In this regard, a multi-carrier terminal is a terminal having the capability of transmitting information on more than one carrier simultaneously. Many such terminals might be employed in a code division multiple access (CDMA) wireless communication system. For example, in an application requiring high-speed data and voice traffic to be transmitted simultaneously, it would be possible to use a multi-carrier terminal with one carrier supporting the CDMA2000_1x standard for voice traffic and another carrier supporting the CDMA2000_1xEv-DO standard, which is optimized for transmission of data traffic. The transmitting terminal would use one carrier, designated the "DO" carrier, for transmission of data traffic, and would use another carrier, designated as the "1x" carrier for transmission of voice traffic. A description of these systems may be found in their corresponding "3rd Generation Partnership Project 2" (3GPP2) standards. The CDMA2000_1x system is specified in "cdma2000 Introduction Release C," 3GPP2 C.S0001-C v1.0, May 2002. The CDMA2000_1xEv-DO system is specified in "cdma2000 High Rate Packet Data Air Interface Specification," 3GPP2 C.S0024-0 v4.0, October 2002.

Effective transmitter design for a multi-carrier terminal could embrace multiple power amplification circuits, each dedicated to one carrier and each including a power amplifier. However, limitations on space, manufacturing cost, power consumption and other factors dictate the need to share resources among the carriers, including power amplification circuitry. Accordingly, it would be advantageous to utilize a single power amplifier for transmission of a plurality of carriers transmitted by a multi-carrier terminal.

A power amplifier is an RF element of a transmitter that amplifies a modulated carrier signal for transmission by an antenna. Although a power amplifier may be depicted and referred to as if it were a single element, those skilled in the art will appreciate that such a device may comprise one or more stages.

If a multi-carrier terminal has a single power amplifier for simultaneous transmission of different types of carrier signals, the power amplifier may be subject to power constraints imposed by spectral emission requirements, by on-board battery capacity, and also by any priority among the carriers. For example, in a combined CDMA2000_1x_/_CDMA2000_1xEV-DO wireless communication system, presume that the 1x carrier takes precedence in the allocation of transmitter power over the DO carrier in order to avoid degradation in the voice cell coverage. Because the 1x carrier has priority over the DO carrier, the only power limitations imposed on the 1x carrier other than the peak power of the power amplifier are battery capacity and spectrum emission control schemes to limit the transmit power of mobile stations. Therefore, if the DO carrier has lower priority than the 1x carrier, it would be desirable to allocate to the DO carrier only some portion of transmitter power not used by the 1x carrier.

Furthermore, when the 1x and DO carriers are simultaneously transmitted, it would be desirable that the power of the multi-carrier waveform transmitted by the multi-carrier terminal be limited to a level such that spectral emission goals are not compromised. It is further desirable to preserve these power constraints while requiring little modification to the equipment and operations of existing communication systems.

Therefore, there is a need in the art for a scheme for allocating the transmit power of a carrier according to a priority in a multi-carrier terminal in which a single power amplifier is utilized for transmitting a plurality of carrier signals simultaneously.

SUMMARY

Embodiments disclosed herein address the above stated needs by assigning precedence to a first carrier of a multi-carrier transmitter with a plurality of carriers served by a single power amplifier and allocating transmission power subject to a limit to one or more other carriers according to whether or not the channel served by the first carrier is in an active state. This ensures that the first carrier will be able to utilize what it needs of the total available transmission power, up to the limit, and that the next carrier has available for its needs the total available transmission power less the total power used by the first carrier. This ordered apportioning of power may be employed for a plurality of carriers that use the power amplifier, with the next carrier in priority having available for its needs the total available transmission power less the total power used by all of the carriers preceding it in priority.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this description are exemplary embodiments provided to enable persons skilled in the art to make or use the invention and not to limit the scope of the invention which is defined by the claims.

A subscriber station, referred to herein as an access terminal (AT), may be mobile or stationary, and may communicate with one or more base station transceivers (BTSs). An access terminal transmits and receives voice and data traffic through a base station transceiver subsystem coupled to a base station controller (BSC). Base station transceivers and base station controllers are parts of a network called an access network.

An access network transports voice and data communications to and from multiple access terminals. The access network may be further connected to additional networks outside the access network, such as a public switched telephone network (PSTN), a corporate intranet or the Internet, and may transport voice and data communications between each access terminal and such outside networks. An access terminal that has established an active traffic channel connection with one or more base station transceivers is called an active access terminal, and is said to be in an active (also "traffic") state. Similarly, the traffic channel itself is said to be in the active state. An access terminal that is in the process of establishing an active traffic channel connection with one or more base station transceivers is said to be in a connection setup state. Similarly, the traffic channel itself is said to be in the connection setup state. A traffic channel that is in neither an active state nor a connection setup state is said to be in an idle state. An access terminal may be any device that communicates through a wireless channel or through a wired channel, for example, using fiber optic or coaxial cables. An access terminal may further be any of a number of types of devices including but not limited to PC card, compact flash, external or internal modem, or wireless or wireline telephone.

Figure 1:
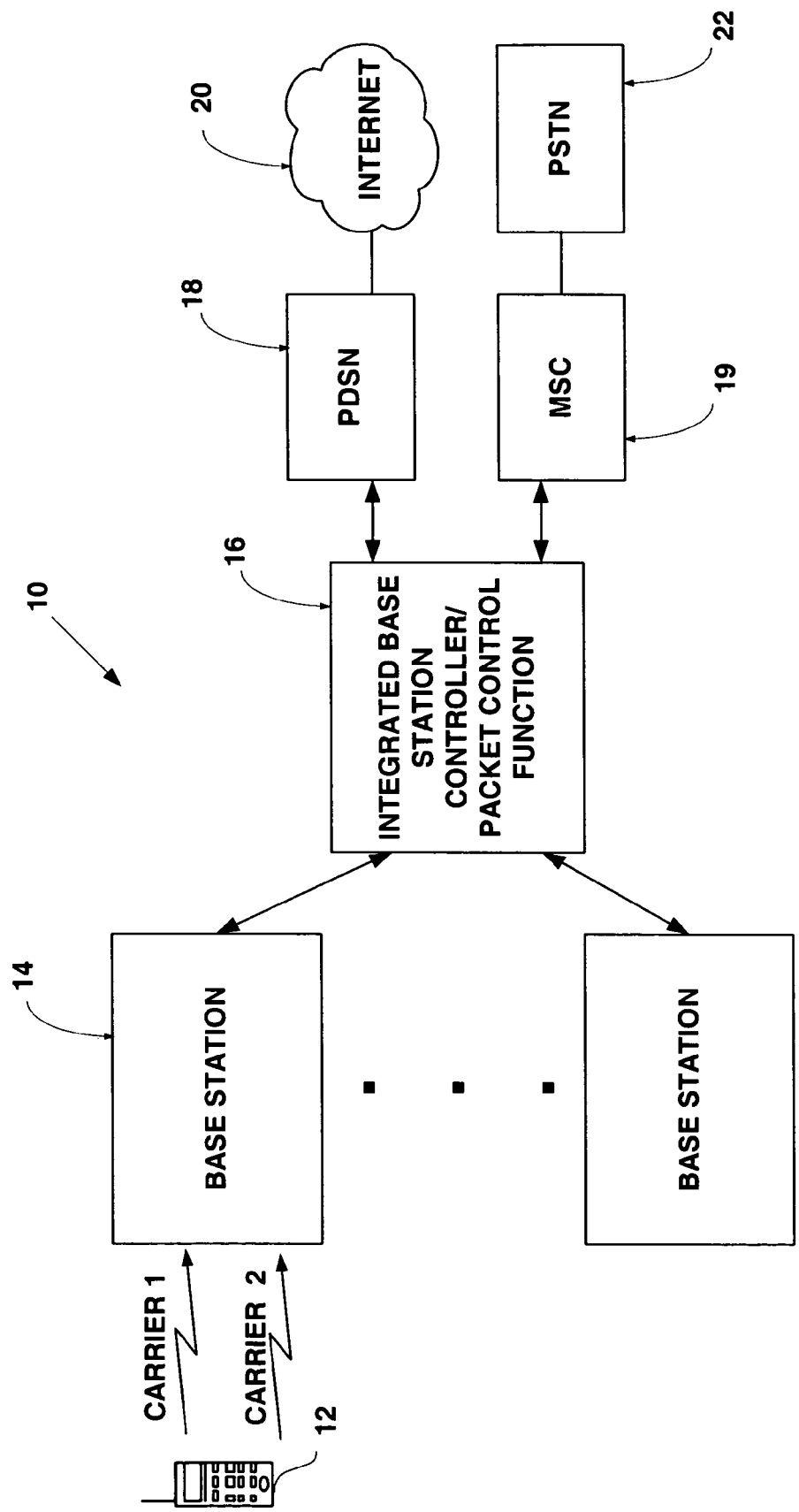
FIG. 1 is an exemplary block diagram of a multi-carrier system.

FIG. 1 illustrates a wide area system 10 whose network architecture affords an access terminal 12 with access to one or more packet switched networks such as the Internet 20, and to one or more public switched telephone networks (PSTN) such as the PSTN 22. The wide area system 10 may be, for example, a wide area wireless system, and the access terminal 12 a wireless device, although this is meant to illustrate and not to limit use or application of the principles set out in this description. As a wide area wireless system, the system 10 would include network infrastructure, such as a base station transceiver subsystem (BTS) 14 having multiple base stations connected to one or more integrated base station controllers (BSC) 16, each with a packet control function. At a base station controller, data is routed to and from the Internet 20 by way of a packet data serving node (PDSN) 18, and voice is routed to and from a PSTN by way of a mobile switching center (MSC) 19. The communication link through which the access terminal 12 sends signals to the subsystem 14 is called a reverse link. The communication link through which the subsystem 14 sends signals to an access terminal is called a forward link. Forward and reverse links may include multiple channels. For example, a forward link may include traffic, control and pilot channels. A reverse link may include traffic, overhead and pilot channels.

In the exemplary wide area wireless system, the access terminal 12 could be embodied in a wireless transceiving device which communicates over the air with the BTS 14. The access terminal 12 is capable of transmitting information into the wide area system on a reverse link by way of a plurality of carriers, two of which are denoted as carrier 1 and carrier 2. The access terminal 12 also has the capability of receiving information from the wide area system 10 on a forward link, which is not shown in this figure. When the access terminal is sending voice signals, say on carrier 1, the voice signals are transmitted to a BTS and are forwarded to a BSC. The BSC forwards the voice signals through a MSC to a PSTN. The access terminal may also transmit data, in the form of data packets, say on carrier 2, to a BTS, which forwards the packets to a BSC. A packet control function coupled to or integrated with the BSC forwards the data packets to a PDSN, which forwards the data packets to a packet data network.

Bidirectional signal transmission between access terminals and the network architecture of a wireless wide area network is managed in order to provide communication access at a predetermined standard of quality to the greatest number of access terminals. In this regard, for example, a CDMA system limits access terminal transmission power to a level that maintains the quality of communications between an access terminal and the network, but that limits the aggregate interference that all such communications cause. Transmission power control in a CDMA system is implemented through a combination of open loop and closed loop procedures. Open loop power control of an access terminal transmitter requires receipt at the access terminal of the forward link signal and calculation by the terminal of a reverse link transmission power level based on the received forward link signal power level. Closed loop power control is implemented by transmission of power level setting commands to the access terminal on the forward link. In this regard see, for example, U.S. Pat. Nos. 5,056,109; 5,267,262; 5,933,781; 6,035,209; 6,101,179; and 6,609,008; all assigned commonly with this application and incorporated by reference.

Figure 2:
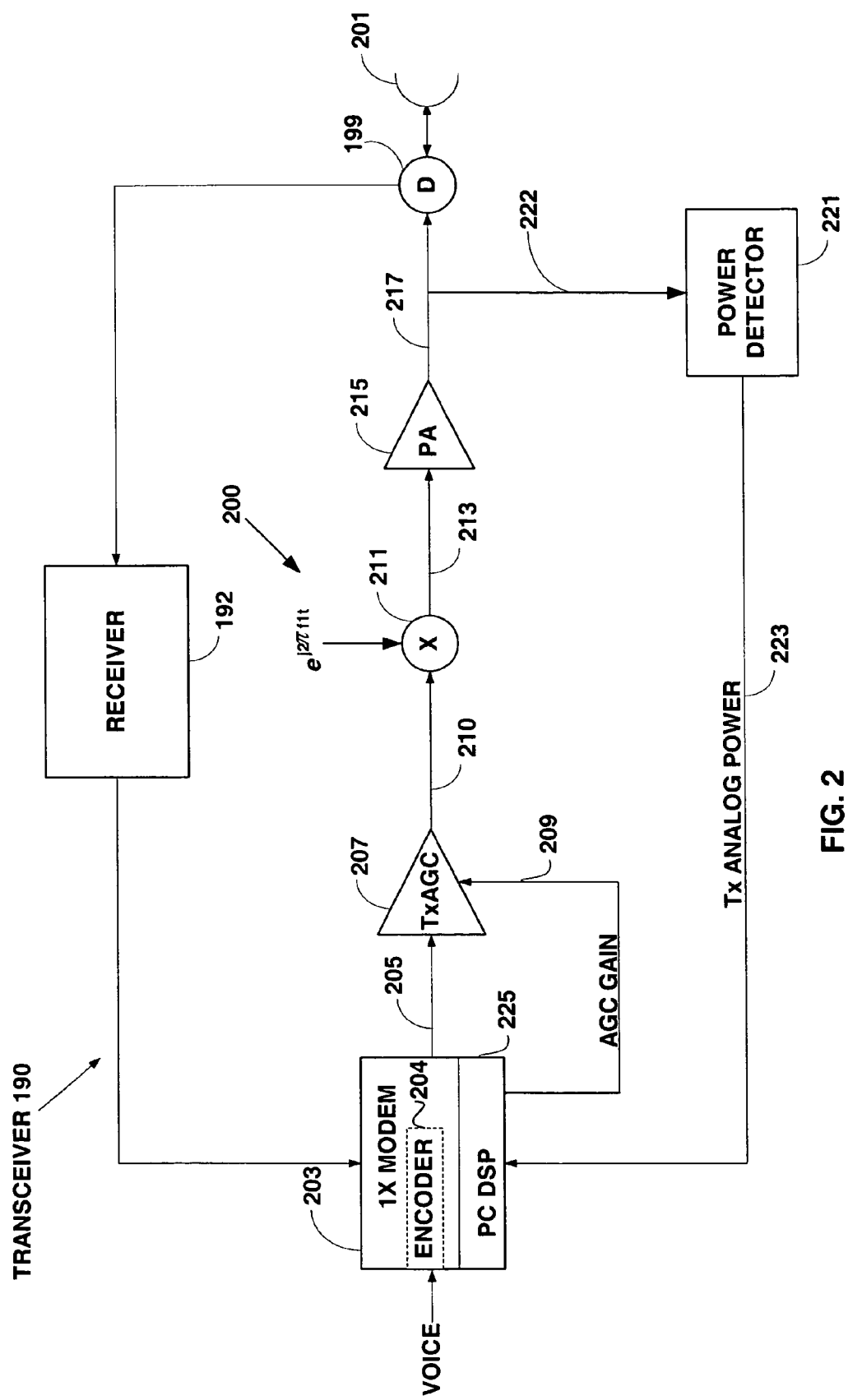
FIG. 2 is an exemplary block diagram of a transceiver for a single carrier terminal.

FIG. 2 is a block diagram of a transceiver 190 that may be used in an access terminal for forward and reverse link communications. The transceiver 190 includes a receiver 192, a diplexer 199, a transmitter 200, and an antenna 202. The receiver 192 and transmitter 200 are connected to the antenna 202 through the diplexer 199. The receiver 192 supports forward link communications, while the transmitter 200 is used for reverse link communications. Other access terminal components are not shown but may be understood with reference to the incorporated patents. In FIG. 2, a voice ("1x") modem receives forward link spread communications via the diplexer 199 from the receiver 192, and despreads, and demodulates forward link channels. The modem 203 also receives encoded voice signals from an encoder 204 for transmission on a reverse link. To support reverse link voice traffic, the modem 203 includes modulators (not shown) for generating a voice traffic symbol signal, a pilot symbol signal, and one or more overhead symbol signals. The modem 203 spreads these signals according to different channel codes, sums those signals to produce an aggregate signal, and modulates the aggregate signal with a spreading code, producing a spread baseband signal on an output signal path 205. The output signal path 205 connects the modem 203 to a voice transmission circuit which may include an automatic gain controlled (TxAGC) amplifier 207, and a mixer 211. The spread baseband signal is input to the amplifier 207, where it is amplified to a controlled level. The amount of gain with which the amplifier 207 amplifies the baseband samples is determined by an AGC gain signal provided to a control input of the amplifier 207 on signal path 209. The amplified spread baseband signal is output on a signal path 210 to the input of the mixer 211. The mixer 211 also receives a first mixing signal ej2πf1t and produces a signal which is the product of the amplified baseband signal and the first mixing signal. Those skilled in the art will realize that mixing may be done in several steps. The product of mixing is the upconversion of the spread baseband signal to a desired RF frequency. For convenience this product may be called "the voice carrier signal." The voice carrier signal is provided on the signal path 213 which connects the mixer 211 to a power amplifier (PA) 215. The power amplifier 215 amplifies the voice carrier signal, producing an amplified voice carrier signal on signal path 217 which connects the power amplifier 215 to the antenna 202 through the diplexer 199. From the antenna 202, the amplified voice carrier signal is transmitted on a reverse link to a base station transceiver subsystem (not shown). The power level of the amplified voice signal is measured by a power detector 221, connected by signal path 222 to the output of the power amplifier 215. Since the signal whose power level is being measured is an analog signal transmitted by the transmitter 200, the measured parameter is called "transmission power" and the signal denoting the measurement is shown as TxAnalogPower in FIG. 2.

Transmission power control in an access terminal containing the transmitter 200 may be implemented by a power control system endowed with the ability to execute power control functions, including those to be described, as well as open and closed loop power control functions. In this latter regard, see the incorporated U.S. Pat. Nos. 5,933,781 and 6,609,008. Power control functions may be embodied for example in a digital signal processor (DSP) 225 either programmed or designed to perform system power control activities. The processor 225 may be a stand-alone circuit-board mounted element with signal path connections to transceiver elements, or it may be integrated with transceiver elements in a single integrated circuit or a chip set. The processor 225 receives open loop and closed loop power level signals for performing calculations and taking actions required to implement those power control functions. The processor 225 also receives the TxAnalogPower signal from the power detector 221 by way of signal path 223. (Note that, although the power detector 221 is shown as a separate element, it may well be integrated into the processor 225). The TxAnalogPower signal enables the processor 225 to sense the power level of the amplified voice carrier signal, in response to which it may control or adjust the power level of the voice carrier signal by the AGC gain signal provided on signal path 209 which connects the processor 225 to the control input of the amplifier 207. Manifestly, controlling the power level of the voice carrier signal at this point effectively controls the power level of the amplified voice carrier signal produced by the power amplifier 215. The processor 225 conditions the AGC gain signal to establish the amount of gain of the amplifier 207, and thereby, to maintain, increase, or decrease the power level of the amplified voice carrier signal. Two exemplary constraints on amplified voice carrier signal power level which the processor operates to implement are the maximum transmission power capacity of the terminal, determined by battery capacity considerations, and actual or proposed regulatory limitations on licensed use. In this latter regard, reference is given to a proposed standard TIA/EIA-IS-98D which establishes maximum transmission power emission levels for several radio configurations. If the transmission power level approaches or exceeds the maximum transmission power level, the processor 225 limits or reduces the gain of the amplifier 207 which in turn limits or reduces the power level of the amplified voice carrier signal in order to avoid compromising the emissions specifications.

Prioritized Apportionment of Transmission Power in a Multi-Carrier Terminal

Figure 3:
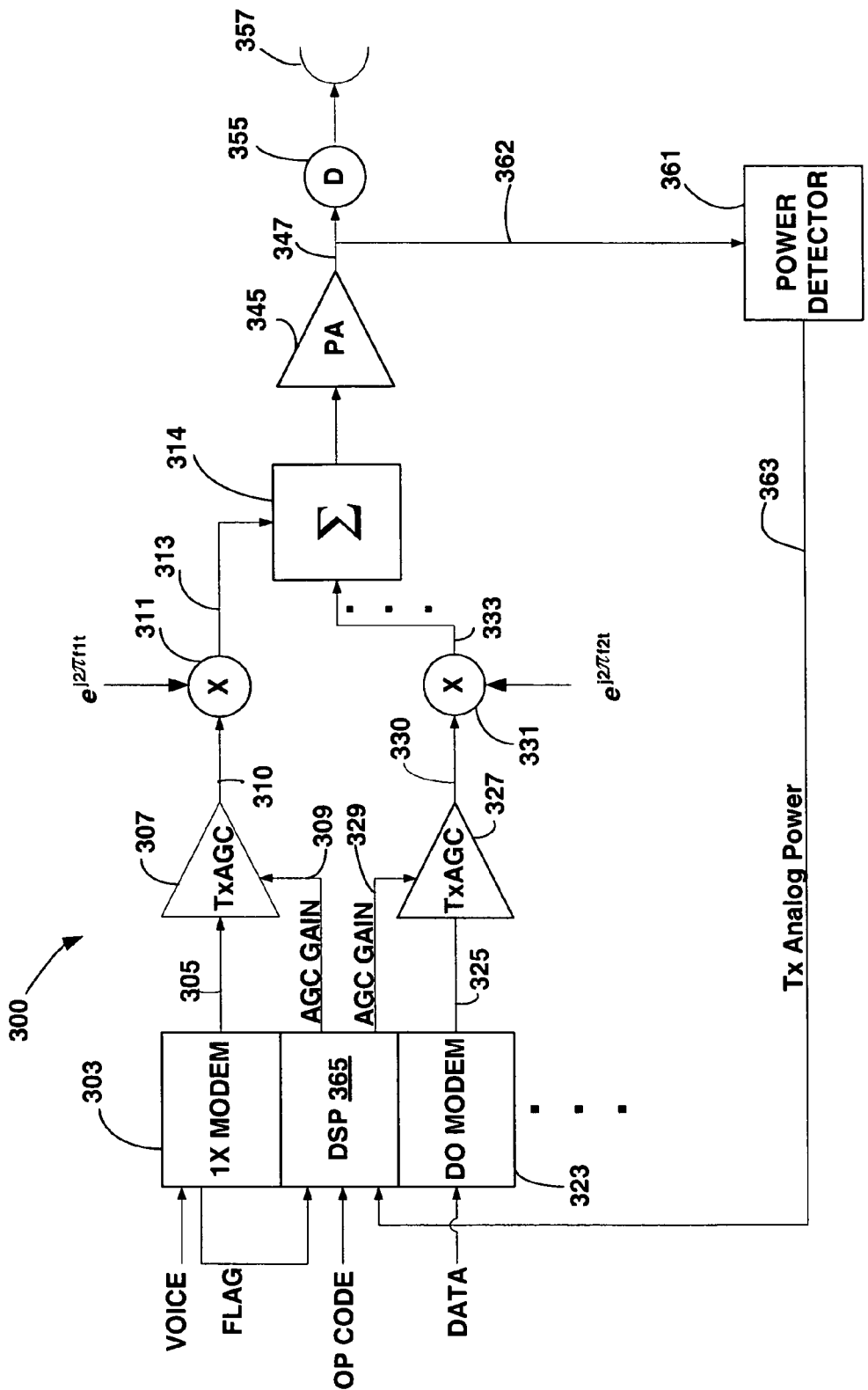
FIG. 3 is an exemplary block diagram of a transmitter for a multi-carrier terminal.

Refer now to FIG. 3 which is a general block diagram of a multi-carrier transmitter 300 that may be used in the transceiver of an access terminal for reverse link communications. The transmitter 300 may be used for prioritized apportionment of transmission power in a multi-carrier access terminal. The transmitter receives voice input from a voice ("1x") modem 303. The voice modem 303 receives forward link spread voice communications from a receiver (not shown), and despreads, and demodulates a forward link voice channel. The voice modem 303 also includes modulators (not shown) for generating a voice traffic symbol signal, a pilot symbol signal, and one or more overhead symbol signals. The voice modem 303 spreads those signals according to different channel codes, sums them to produce an aggregate voice channel signal, and modulates the aggregate voice channel signal with a spreading code, producing a voice channel signal at baseband on an output signal path 305. The output signal path 305 connects the voice modem 303 to a voice transmission circuit which may include an automatic gain controlled (TxAGC) amplifier 307, and a mixer 311. The voice channel signal is input to the amplifier 307, where it is amplified to a controlled level. The amount of gain with which the amplifier 307 amplifies the voice channel signal is determined by an AGC gain signal provided to a control input of the amplifier 307 on signal path 309. The amplified voice signal is output on a signal path 310 to the input of the mixer 311. The mixer 311 also receives a first mixing signal $ej2\pi f1t$ and produces a signal which is the product of the amplified voice channel signal and the first mixing signal. The product is the upconversion of the voice channel signal to a desired RF frequency. For convenience this product may be called "the voice carrier signal," or simply "the voice carrier." The voice carrier signal is provided on the signal path 313 which connects the mixer 311 to a signal combiner or summer 314.

Continuing with the description of FIG. 3, the transmitter 300 receives data input from a data ("DO") modem 323. The data modem 323 receives forward link spread data communications from a receiver (not shown), and despreads, and demodulates a forward link data channel. The data modem 323 also includes modulators (not shown) for generating a data traffic symbol signal, a pilot symbol signal, an acknowledgement (ACK) symbol signal, and a data rate control (DRC) symbol signal. The data modem 323 spreads those signals according to different channel codes, sums them to produce an aggregate data channel signal, and modulates the aggregate data channel signal with a spreading code, producing a data channel signal at baseband on an output signal path 325. The output signal path 325 connects the data modem 323 to a data transmission circuit which may include an automatic gain controlled (TxAGC) amplifier 327, and a mixer 331. The data channel signal is input to the amplifier 327, where it is amplified to a controlled level. The amount of gain with which the amplifier 327 amplifies the data channel signal is determined by an AGC gain signal provided to a control input of the amplifier 327 on signal path 329. The amplified data signal is output on a signal path 330 to the input of the mixer 331. The mixer 331 also receives a second mixing signal $ej2\pi f2t$ and produces a signal which is the product of the amplified data channel signal and the second mixing signal. The product is the upconversion of the data channel signal to a desired RF frequency. For convenience this product may be called "the first data carrier signal" (or "the first data carrier") as there may be additional sections of the transmitter for generating additional data carriers. The first data carrier signal is provided on the signal path 333 which connects the mixer 331 to the signal combiner or summer 314.

The signal combiner 314 sums the voice carrier, the first data carrier, and other carriers as might be produced by other transmitter circuits (not shown) to produce a multi-carrier signal that is input to a power amplifier (PA) 345. The power amplifier 345 amplifies the multi-carrier signal, producing an amplified multi-carrier signal on signal path 347 which connects the power amplifier 345 to an antenna 357 through a diplexer 355. From the antenna 357, the amplified multi-carrier signal is transmitted on a reverse link to a base station transceiver subsystem (not shown). The power level of the amplified multi-carrier signal is measured by a power detector 361, connected by signal path 362 to the output of the power amplifier 345. Since the signal whose power level is being measured is an analog signal transmitted by the transmitter 300, the measured parameter is called "transmission power" and the signal denoting the measurement is shown as TxAnalogPower in FIG. 3.

Power control functions for the transmitter 300 may be embodied for example in a digital signal processor (DSP) 365 either programmed or designed to perform system power control activities according to open and closed loop algorithms. The processor 365 may be a stand-alone element with signal path connections to transceiver elements, or it may be integrated with transceiver elements in a single integrated circuit or a chip set. The processor 365 receives open loop and closed loop power level signals for performing calculations and taking actions required to implement those system power control functions. The processor 365 also receives the TxAnalogPower signal from the power detector 361 by way of signal path 363. (Note that, although the power detector 361 is shown as a separate element, it may well be integrated into the processor 365). The TxAnalogPower signal enables the processor 365 to sense the power level of the amplified multi-carrier signal, in response to which it may control or adjust the power level of the voice carrier signal by the AGC gain signal provided on signal path 309 which connects the processor 365 to the control input of the amplifier 307. The processor may also respond to the TxAnalogPower signal by controlling or adjusting the power level of the first data carrier signal by the AGC gain signal provided on signal path 329 which connects the processor 365 to the control input of the amplifier 327. The processor 365 conditions the AGC gain signals to establish the amount of gain of the amplifiers 307 and 327, and thereby, to maintain, increase, or decrease the power levels of the voice and at least one data carrier. Manifestly, control of the power levels of the carriers affords control of the power level of the amplified multi-carrier signal produced by the power amplifier 215.

Presume that the transmitter of a multi-carrier access terminal supporting simultaneous transmission of more than one carrier is constrained to using one power amplifier such as is the case in the transmitter of FIG. 3. Presume further that simultaneous transmission of multiple carriers from the terminal is subject to the following constraints:

There is a predetermined limit on the amount of power that the multi-carrier signal may have ("maximum transmission power"). The predetermined limit may result, for example, from terminal power capacity and spectral emission constraints. Thus, the transmission power must be apportioned among the carriers.

There is a priority among the carriers for apportionment of the transmission power. Thus, the carrier with the highest priority will have no limitations on the level of power it may reach, up to the predetermined limit. Carriers of the next and lower priorities will be allocated as much of the transmission power as remains after reduction of the maximum transmission power level by apportionment to carriers of higher priority.

With reference to FIG. 2, the power detector 221 provides a measure of analog signal power at the output of the power amplifier 215, enabling the processor 225 to perform back-off of the transmission power level as may be required by regulatory action, for example by the emission limitations set forth in the above-cited IS-98D. The power detector may be used in a multi-carrier, single power amplifier transmitter, such as that illustrated in FIG. 3, to limit data carrier power in order to enable imposition of the constraints set forth above. The following description is an illustrative embodiment in which transmission power is apportioned between two carriers in which a first carrier (for voice traffic, in this example) has the highest priority and a second carrier (for data traffic, in this example) has the next priority. This example used as an aid in teaching the principles of prioritized apportionment of transmission power and is not intended to limit the application of these principles to two carriers, to a carrier priority scheme in which a voice carrier is always accorded the highest priority, Indeed, the priority algorithms described below may be adapted to apportion transmission power among more than two carriers with the basis of priority being a matter of design choice. Further, the example illustrates the principles with a terminal that has a single power amplifier. This illustration is not meant to limit the application of these principles to a terminal with a single power amplifier, rather the principles apply to situations in which a single power amplifier must serve a plurality of carriers which may be simultaneously transmitted.

A power amplifier headroom algorithm may be implemented in data carrier terminals to calculate a maximum data rate at which a terminal may transmit on a reverse link. The algorithm may be performed by a DSP such as the processor 365 in FIG. 3. The algorithm initially considers an upper bound for the power of a reverse link data channel pilot signal:

$$\text{Pilot PowerUpperBound(dB)} = \text{LPFTxOpenLoop} + \text{PeakFilterTxClosedLoop} + \text{Margin} \quad (1)$$

Equation (1) defines an upper bound for the amount of transmission power available in a data reverse link that is apportioned to the pilot channel. The LPFTxOpenLoop contribution is a low pass filtered value measured during open loop power control processing. The PeakFilterTxClosedLoop contribution is a peak filtered value obtained during closed loop power control processing. The Margin contribution provides an upper bound for the Pilot Channel during the entire duration of a data packet being transmitted on the reverse link; this value may be set to a predetermined level or changed dynamically to accommodate channel conditions. The filter types used to obtain the open loop and closed loop contributions are different. A low pass filter of instantaneous values is used to obtain open loop power control values, while a peak filter with a long decay time is used to obtain closed loop power control values.

A reverse link data channel transmits data at a rate commensurate with a level of transmission power available to the data channel, taking into account the fact that the available transmission power is limited and must be apportioned among pilot, data, acknowledgement (ACK), and data rate control (DRC) channels. The transmission power available for these channels may be determined by means of channel gains referenced to the power level of the pilot channel. Accordingly, as channel conditions vary, power can be reapportioned, possibly resulting in a requirement to change the data rate. The following table summarizes the required link data rate with respect to the relative power gain with respect to the pilot channel available to the data channel (DataChannelGain).

| RL Data Rate | DataChannelGain |
| --- | --- |
| 9.6 kbs | 3.75 dB |
| 19.2 kbs | 6.75 dB |
| 38.4 kbs | 9.75 dB |
| 76.8 kbs | 13.25 dB |
| 153.6 kbs | 18.50 dB |

Now, a power amplifier (PA) headroom algorithm gives power amplifier headroom for transmission of a particular data rate, where actual values are in the linear domain (lin).

$$PAHeadroom(rate) = MaxPower(lin) - [PilotPowerUpperBound(lin) * T2P(rate)] \quad (2)$$

Note that, while equation (1) is expressed in non-linear terms (dB), equation (2) and the equations which follow are expressed in linear terms, as an aid to understanding the concepts being presented. As may be understood with reference to equation (2), the PA headroom is calculated with reference to a maximum power level (MaxPower(lin)) that limits the transmission power at which a terminal may transmit. As stated above, this limit may result simply from battery capacity, or from a combination of factors. In any event, the pilot channel power may be scaled to account for the other channels (data, ACK, and DRC) that are transmitted in association with data traffic. Account is taken of these other channels by the ratio T2P(rate), which incorporates the relative gain of each of those channels with respect to the pilot channel for a particular data rate. Thus:

$$T2P(rate) = [1 + DRCChGain + ACKChGain + DataChGain(rate)] \quad (3)$$

Equation (3) is a gain that translates pilot channel power to overall signal power for all of the data traffic channels. Manifestly, a data rate is transmittable if PAHeadroom(rate)>0. Because data traffic has a lower priority than voice traffic in this example, this headroom algorithm is slightly altered to calculate the maximum power that a first data carrier (second in priority to the voice carrier) can take at any time with reference to the portion of transmission power used by the voice carrier in a multi-carrier, single power amplifier transmitter.

Data carrier power limitation in a multi-carrier, single power amplifier terminal is calculated, for example by a DSP like the processor 365 according to an algorithm meeting the constraints that maximum transmission power is limited and the voice carrier is given available transmission power in preference to any data carrier. In other words, any data carrier requiring transmission power will be allotted what transmission power remains after providing to the voice carrier whatever portion of the available transmission power it needs. The algorithm takes into account the possibility of user and system selection of operating modes (signified by the OP CODES input to the processor in FIG. 3) according to which at least three modes are possible: the voice channel and at least one data channel are active (voice/data); only the voice channel is active (voice-only); and, only the data channel is active (data-only). According to a carrier priority observed by the algorithm, power control of the voice carrier does not take into account the state of any data carrier; however, power control of any data carrier takes into account the state of the voice carrier; that is to say, the voice carrier has a higher priority in transmission power apportionment than any data carrier.

In the voice/data operational mode, there is a maximum transmission power allocated for the voice carrier (MaxTxPowerAnalog). As a rule, the voice carrier does not use all of the transmission power available, and the unused portion is provided to a data carrier, subject to the current power level of the data pilot channel. The expression for the maximum amount of power apportioned for the data carrier is:

$$MaxDataPower(lin) = [MaxTxPowerAnalog - TxAnalogPower] + [TxPilotPower(lin) * T2P(rate)] - MarginForVoice \quad (4)$$

In this calculation, the variable MaxTxPowerAnalog is the maximum transmission power available for the multi-carrier signal, and it is this power which is apportioned on a priority basis to the voice carrier, if the voice channel is in an active or a connection setup mode, and to one or more data carriers on a secondary basis following apportionment, if any, to the voice carrier. This variable may be a fixed value, for example, the worst case expected transmission power for the voice carrier, or may be a function that yields a value based on a current operational mode. For example, under the condition that the voice channel is active, it may be necessary to limit MaxTxPowerAnalog to 200 mW (23 dBm) as a straightforward check on the transmission power level of the multi-carrier signal when both voice and data channels are active. According to a more elaborate procedure, the value of MaxTxPowerAnalog might be changed as a function of the power level of the voice carrier. For example, if the power level of the active voice carrier is well below 23 dBm it might be useful to relax the constraint on total transmission power as long as the spectral transmission levels for the multi-carrier signal with two or more channels active can be met. One would expect that the amount of transmission power available for data traffic could be calculated simply by subtracting voice carrier power from MaxTxPowerAnalog. However, the variable TxAnalogPower is the transmission power measured, for example, by the power detector 361 at the output of the power amplifier 345 in FIG. 3, and this measurement represents the total amount of transmission power being used by the voice carrier and the data carrier (if any. Accordingly, the amount of transmission power used by the data carrier is added back by the term [TxPilotPower(lin)*T2P(rate)] in order to limit the calculation to the amount of transmission power diminished only by the transmission power apportioned to the higher-priority carrier. The variable TxPilotPower is the current power level of the data pilot channel, and T2P is the current overall traffic to pilot ratio. The MarginForVoice variable is an incremental allocation of additional transmission power to the voice carrier as a hedge against predicted or known transmission impairments on the frequency of the voice carrier; this value may be fixed or determined by a function. Once this calculation is completed, the power level of the data carrier can be set by the processor 365 by way of the AGC gain signal provided to the amplifier 327, and a data rate can be determined by solving the PA Headroom equation with substitution of MaxDataPower for MaxPower.

In the voice-only operational mode, the voice carrier power control calculations are made by the processor 365 and the results are carried out by setting the gain of the amplifier 307 by way of the AGC gain signal provided to the control input of the amplifier 307. While the terminal is operating in a voice only mode, the terminal user may call up an email program. Once the email message is composed and the user activates the "SendMail" command, the reverse link data channel carrying email traffic enters the connection setup state wherein one or more access probes will be sent on the reverse link to activate the data channel. Once the channel is activated, the voice/data mode is entered and the email message is sent. At such time as the data channel enters the connection setup state in preparation for initiating data transmission by way of the first data carrier, the data modem 323 begins to cause transmission of access probes on the first data channel of the reverse link. The processor now has to calculate and set a power level at which the data carrier communicates the current access probe. In this case, the MaxDataPower is calculated as follows:

$$MaxDataPower(lin) = [MaxTxPowerAnalog - TxAnalogPower] - MarginForVoice \quad (5)$$

The value calculated for MaxDataPower will be the maximum power at which the current access probe will be set, which may be by the processor 365 setting an appropriate value for AGC gain for the amplifier 327.

In the data-only operational mode, the data channel is active. Without the voice channel in a connection setup state, the processor 365 sets power for the data carrier according to equation (4) above, with the MarginForVoice component set to zero. While the terminal is operating in a data only mode, the terminal user may begin keying in a telephone number which would cause the voice channel to enter the connection setup state wherein one or more access probes will be sent to activate the voice channel. However, the terminal would not, in this exemplary case, enter the voice/data mode until the user activates the "Send Call" command. When the voice channel enters the setup mode, the voice modem 303 issues an access flag (FLAG input to the processor 365 in FIG. 3) and prepares to send an access probe on the voice channel. In response to the access flag, the processor 365 adjusts the portion of transmission power allocated to the data carrier by setting MarginForVoice in equation (4) to a maximum value, solving the equation, and adjusting the gain of the amplifier 327 appropriately. When data carrier power is reduced to accommodate the voice carrier, the processor 365 uses the PAHeadroom equation (2) to determine whether the data rate for the data channel must be changed. If a change is required, the data modem 323 is signaled to change the data rate on the reverse link data carrier.

Figure 4:
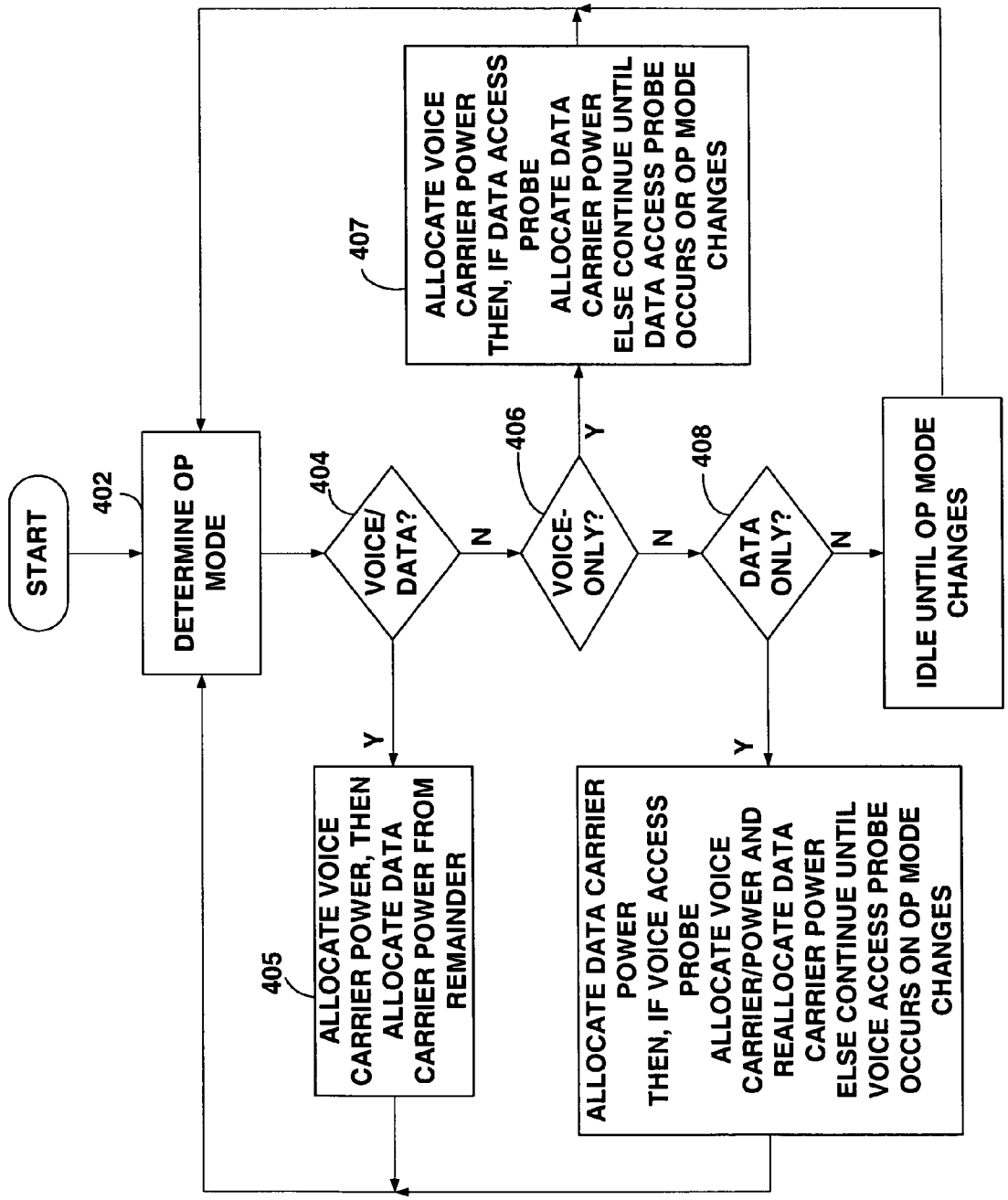
FIG. 4 is a flow diagram illustrating a method of prioritized allocation of transmission power in a multi-carrier terminal.

A method for prioritized apportionment of transmission power in a multi-carrier access terminal is illustrated in FIG. 4. Although the overall flow and individual acts of this method will be described with reference to the multi-carrier transmitter of FIG. 3, this is meant for ease of understanding only; in fact, the method may be implemented in many other multi-carrier terminals. In FIG. 4 it is assumed that the access terminal has been turned on and is in some initial operational mode defined by the OP MODE input to the processor 365. Let this condition define the START of the method. When the OP CODE changes in block 402, either the terminal has entered an IDLE state wherein neither voice nor data traffic has been initiated, or a user of the terminal has selected an operational mode in which voice, data, or voice and data traffic has been initiated. In the first case, the method transitions through decisions 404, 406, and 408 to the IDLE state in block 410 whence it transitions to block 402 when an operational code is entered by a user. When an operational code is entered, the method transitions from block 402 and tests the code first in decision 404. If the code indicates the voice/data operational mode, the positive exit is taken from decision 404 and the apportionment of transmission power is made in block 405 according to the priority described above. That is, the gain of the amplifier 307 is set to a level which accords the voice carrier as much of the MaxTxPowerAnalog as is necessary to support voice traffic. At the same time, MaxDataPower is calculated according to equation (4) and the data carrier is set to the calculated power level by setting the gain of the amplifier 327. The method remains in this condition until the operational mode changes, either through user action, or through some system-initiated transition; in either case, the method again enters block 402. Assuming that the test in decision 404 indicates that the operational mode is not voice/data, the method enters decision 406 by way of the negative exit from decision 404. If the operational mode is voice only, the positive exit is taken from decision 406 and the method enters block 407. In block 407, the gain of the amplifier 307 is set to a level which accords the voice carrier as much of MaxTxPowerAnalog as is necessary to support voice traffic. Then, if a data access probe occurs, MaxDataPower is calculated according to equation (5) and the gain of the amplifier 327 is adjusted as necessary to provide the data carrier the MaxDataPower level resulting from the calculation. Otherwise, the method remains in block 407, responding to data access probes if and as needed, until the operational mode changes, in which case the method returns to block 402. If the test in decision 406 indicates that the operational mode is not voice only, the method enters decision 408 and tests whether the operational condition is data only. If the result of the test is positive, the method transitions to block 409, determining MaxDataPower according to equation (4) with MarginForVoice set to zero and adjusting the gain of the amplifier 327 as necessary to provide the data carrier the MaxDataPower level resulting from the calculation. Then, if a voice access probe occurs, MaxDataPower is calculated according to equation (4) with MarginForVoice set to a large value and the gain of the amplifier 327 is adjusted as necessary to provide the data carrier the MaxDataPower level resulting from the calculation. Otherwise, the method remains in block 409, responding to voice access probes if and as needed, until the operational mode changes, in which case the method returns to block 402.

Figure 5:
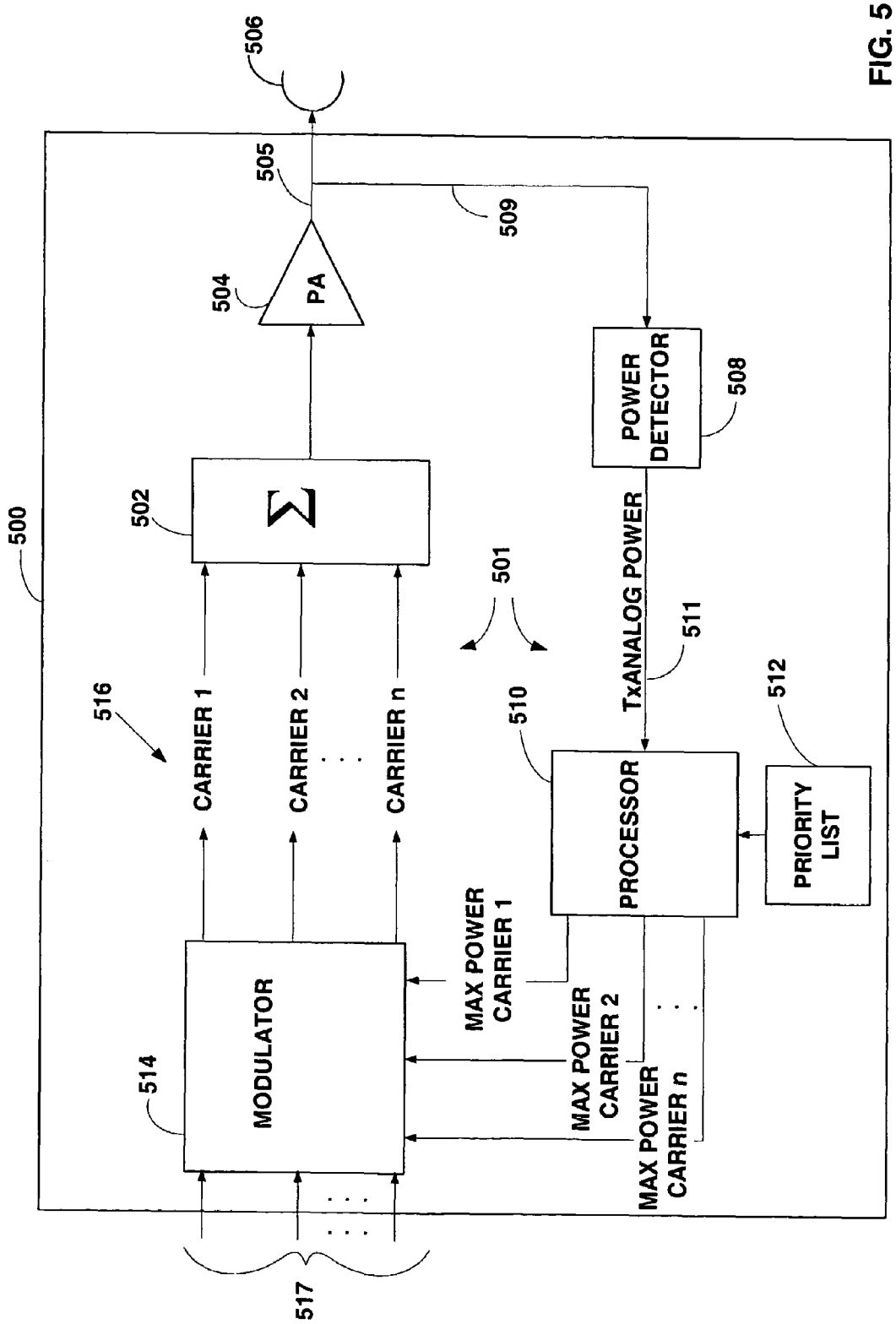
FIG. 5 is a block diagram illustrating a general application of prioritized apportionment of transmission power among a plurality of carriers served by a single power amplifier.

Refer to FIG. 5 which illustrates a general application of prioritized apportionment of transmission power among a plurality of carriers served by a single power amplifier. In FIG. 5, a transmitter 500 includes at least one multi-carrier transmission section 501 in which a plurality of carriers (carrier 1, carrier 2, . . . , carrier n) are summed by a signal combiner 502 which sums the carriers to produce a multi-carrier signal that is input to a power amplifier (PA) 504. The power amplifier 504 amplifies the multi-carrier signal, producing an amplified multi-carrier signal on signal path 505 which connects the power amplifier 504 to an antenna 506. From the antenna 506, the amplified multi-carrier signal is transmitted on a transmission link to one or more receivers (not shown). The power level of the amplified multi-carrier signal is measured by a power detector 508, connected by signal path 509 to the output of the power amplifier 504. Since the signal whose power level is being measured is an analog signal transmitted by the multi-carrier transmission section, the measured parameter is called "transmission power" and the signal denoting the measurement is shown as TxAnalogPower in FIG. 5. A processor 510 receives the TxAnalogPower signal from the power detector 508 by way of signal path 511. (Note that, although the power detector 508 is shown as a separate element, it may well be integrated into the processor 510). The TxAnalogPower signal enables the processor 510 to sense the power level of the amplified multi-carrier signal, and to indirectly obtain the maximum available transmission power (MaxPowerCarrier i) for each of the carriers (carrier 1, carrier 2, . . . , carrier n) provided to a modulator 514 for transmission of the information bit streams for each of the carriers 516. In this regard, each MaxPowerCarrier signal indicates to the modulator 514 the maximum available power level of a correspondingly-numbered carrier signal, and thereby performs the power carrier apportionment in agreement with a priority list 512 and the overall maximum power available for transmission (MaxTxPowerAnalog). Each carrier is provided for transmission of an information signal or channel in response to a respective one of the inputs 517 to the modulator 514. Manifestly, control of the maximum power levels of the carriers affords control of the power level of the amplified multi-carrier signal produced by the power amplifier 504. The processor 510 accesses a priority list 512, which may be a data structure maintained in a memory or storage location (not shown). The priority list 512 establishes a carrier priority according to which precedence is established among the carriers for apportionment of a maximum amount of maximum transmission power for the amplified multi-carrier signal provided to the antenna 506. Presume for illustration, that the numbering of the carriers identifies their positions in the priority. Thus, carrier 1 is the highest priority carrier, carrier 2 the second highest, and so on. Presume also that a carrier can be in any one of a number of states, including at least an active state in which its information signal or channel is active, and an idle state in which its information signal or channel is idle. The maximum transmission power is denoted as MaxTxPowerAnalog. The amount of transmission power allotted to any carrier depends upon the value of MaxTxPowerAnalog, the amount of MaxTxPowerAnalog which is allocated to any higher priority carrier that is active. According to the priority apportionment scheme, the highest priority carrier is allocated as much of MaxTxPowerAnalog as is necessary to satisfy whatever transmission requirements apply to it. Any lower-priority carrier (say, carrier y) will be accorded whatever remains of MaxTxPowerAnalog after allocation to active carriers with higher priority. Because the total power apportioned to active higher-priority carriers is ascertainable from TxAnalogPower and from the knowledge of the modulator 514 of the transmission level of each of the carriers, the maximum amount of transmission power available to carrier y is generally determined by the processor 510 according to:

$$MaxPowerCarrier\ y = \qquad (6)$$
$$MaxTxPowerAnalog - \sum_{i=1}^{y-1}(PowerCarrier\ i) - Margin$$

In this equation, a Margin is provided for predicted, expected, calculated or measured conditions. Its value may, of course, be zero.

Those of skill in the art would understand that information and signals described in connection with the description given above may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described above may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the disclosure given above may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method and algorithms described in connection with the embodiments disclosed herein may be embodied directly in hardware, in a software module executed by a processor, or in a combination of the two. A software module may reside in random access memory (RAM), flash memory, read only memory (ROM), erasable programmable read only memory (EPROM), electrically erasable programmable read only memory (EEPROM), registers, a hard disk, a removable disk, a compact disc-read only memory (CD-ROM), or any other form of storage medium known in the art. An exemplary storage medium is coupled to the processor such that the processor can read information from, and write information to, the storage medium. Alternatively, the storage medium may be integral to the processor. The processor and the storage medium may reside in a single ASIC (application-specific integrated circuit), or as separate components in a base transceiver station, for example.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A transmitter for a multi-carrier terminal, comprising:
a first transmission circuit for providing a first carrier for a first channel;
at least a second transmission circuit for providing at least a second carrier for a second channel;
a combiner connected to the transmission circuits for combining the first carrier and at least the second carrier into a multi-carrier signal;
a power amplifier connected to the combiner for amplifying the multi-carrier signal; and
a processor connected to a power detector and to the transmission circuits for apportioning power available for the amplified multi-carrier signal between the first and second carriers according to a carrier priority, wherein the carrier priority allocates to the first carrier a first carrier portion of the transmission power, and allocates to the second carrier a second carrier portion of the transmission power, the second carrier portion being based on the power available for the multi-carrier signal reduced by the first carrier portion.

2. The transmitter of claim 1, wherein the processor has an input for receiving an operational mode signal indicating whether or not the first channel is in an active state, wherein the carrier priority allocates the first carrier portion if the first channel is in an active state.

3. The transmitter of claim 2, wherein the carrier priority further allocates the first carrier portion if the first channel is in a connection setup state.

4. The transmitter of claim 3, wherein the power available for the multi-carrier signal is limited to a maximum value by a terminal emission constraint.

5. A transmitter for a multi-carrier terminal, comprising:
a voice transmission circuit for providing a voice carrier for a voice channel;
at least one data transmission circuit for providing a at least one data carrier for a data channel;
a combiner connected to the voice transmission circuit and the at least one data transmission circuit for combining the voice carrier and at least the one data carrier into a multi-carrier signal;
a power amplifier connected to the combiner;
a power detector connected to the power amplifier for measuring a power level of an amplified multi-carrier signal produced by the power amplifier; and
a processor connected to the power detector, the voice transmission circuit, and the at least one data transmission circuit for apportioning a maximum amount of transmission power available for the multi-carrier signal between the voice carrier and the one data carrier in a first operational mode of the terminal by first allocating a voice carrier portion of the transmission power to the voice carrier and then allocating a data carrier portion of the transmission power by:

MaxDataPower=[MaxTxPowerAnalog−TxAnalogPower]+[TxPilotPower*T2P(rate)]−MarginForVoice where:
MaxDataPower is maximum power allocated to the one data carrier;
MaxTxPowerAnalog is a maximum level of power available to the voice carrier;
TxAnalogPower is the power level of an amplified multi-carrier signal power measured by the power detector;
TxPilotPower is the power level of a pilot signal of the data channel;
T2P(rate) is a gain to translate the power of the pilot signal to overall signal power; and
MarginForVoice is a margin of power reserved for the voice carrier.

6. The transmitter of claim 5, wherein the voice channel and the data channel are both active in the first operational mode, and the processor is further for apportioning the maximum amount of transmission power available for the multi-carrier signal between the voice carrier and the one data carrier according to a second operational mode of the terminal by:

MaxDataPower=[MaxTxPowerAnalog−TxAnalogPower]−MarginForVoice where the voice channel is in an active state and the data channel is in a connection setup state in the second operational mode.

7. The transmitter of claim 6, the processor is further for apportioning the maximum amount of transmission power available for the multi-carrier signal between the voice carrier and the one data carrier according to a third operational mode of the terminal in which the data channel is the active state by:

MaxDataPower=[MaxTxPowerAnalog−TxAnalogPower]+[TxPilotPower*T2P(rate)]−MarginForVoice where MarginForVoice is set to zero while the voice channel is in an idle state, and is set to a maximum value when the voice channel is in the connection setup state.

8. The transmitter of claim 7, wherein MaxTxPowerAnalog has a maximum value based on a spectral emission constraint.

9. A method of operating a multi-carrier access terminal for a wide area network, comprising:
providing a maximum amount of transmission power for a multi-carrier signal to be transmitted by the terminal;
providing a first carrier for transmitting first information;
providing at least a second carrier for transmitting second information;
combining the first carrier and at least the second carrier into a multi-carrier signal;
apportioning the transmission power for the multi-carrier signal between the first and second carriers according to a carrier priority; and
transmitting the multi-carrier signal at a power no greater then the maximum amount, wherein the carrier priority allocates to the first carrier a first carrier portion of the transmission power, and allocates to the second carrier a second carrier portion of the transmission power, the second carrier portion being based on the power available for the multi-carrier signal reduced by the first carrier portion.

10. The method of claim 9, wherein the terminal has an operational mode indicating whether or not the first carrier is in an active state, wherein the carrier priority allocates the first carrier portion if the first carrier is in an active state.

11. The method of claim 10, wherein the carrier priority further allocates the second carrier portion if the second carrier is in an active state.

12. The method of claim 11, wherein the power available for the multi-carrier signal is limited to a maximum value by a terminal emission constraint.

13. A method for controlling transmission power in a multi-carrier terminal, comprising:
providing a voice carrier for a voice channel;
providing a at least one data carrier for a data channel;
combining the voice carrier and at least the one data carrier into a multi-carrier signal;
amplifying the multi-channel carrier signal;
measuring a power level of the amplified multi-carrier signal; and
apportioning a maximum amount of transmission power available for the multi-carrier signal between the voice carrier and the one data carrier in a first operational mode of the terminal by first allocating a voice carrier portion of the transmission power to the voice carrier and then allocating a data carrier portion of the transmission power by:

MaxDataPower=[MaxTxPowerAnalog−TxAnalogPower]+[TxPilotPower*T2P(rate)]−MarginForVoice where:
MaxDataPower is maximum power allocated to the one data carrier;
MaxTxPowerAnalog is a maximum level of power available to the voice carrier;
TxAnalogPower is the measured power level of an amplified multi-carrier signal power;
TxPilotPower is the power level of a pilot signal of the data channel;
T2P(rate) is a gain to translate the power of the pilot signal to overall signal; and
MarginForVoice is a margin of power reserved for the voice carrier.

14. The method of claim 13, wherein the voice channel and the data channel are both active in the first operational mode, further including apportioning the maximum amount of transmission power available for the multi-carrier signal between the voice carrier and the one data carrier according to a second operational mode of the terminal by:

MaxDataPower=[MaxTxPowerAnalog−TxAnalogPower]−MarginForVoice where the voice channel is in an active state and the data channel is in a connection setup state in the second operational mode.

15. The method of claim 14, further including apportioning the maximum amount of transmission power available for the multi-carrier signal between the voice carrier and the one data carrier according to a third operational mode of the terminal in which the data channel is the active state by:

MaxDataPower=[MaxTxPowerAnalog−TxAnalogPower]+[TxPilotPower*T2P(rate)]−MarginForVoice where MarginForVoice is set to zero while the voice channel is in an idle state, and is set to a maximum value when the voice channel is in the connection setup state.

16. The transmitter of claim 15, wherein MaxTxPowerAnalog has a maximum value based on a spectral emission constraint.

17. A method of operating a transmitter having a power amplifier, comprising:
   providing a maximum amount of transmission power for a multi-carrier signal to be transmitted by the transmitter;
   providing a plurality of carriers for transmitting information;
   apportioning the transmission power for a multi-carrier signal between the carriers according to a carrier priority;
   combining carriers of the plurality of carriers into a multi-carrier signal;
   amplifying the multi-carrier signal with the power amplifier; and
   transmitting the multi-carrier signal at a power no greater then the maximum amount, wherein the maximum amount of transmission power (MaxTxPower) is apportioned to a carrier y of the plurality of carriers according to:

$$MaxPowerCarrier\ y = MaxTxPowerAnalog - \sum_{i=1}^{y-1}(PowerCarrier\ i) - Margin$$

where MaxPowerCarrier y is the maximum amount of power available for carrier y, Margin is a margin of power having a value equal to or greater than zero, and $$\sum_{i=1}^{y-1}(PowerCarrier\ i)$$

is the total transmission power apportioned to carriers of the plurality of carriers having higher priorities than the carrier y.

18. A transmitter for a multi-carrier terminal, comprising:
   means for providing a maximum amount of transmission power for a multi-carrier signal to be transmitted by the terminal;
   means for providing a first carrier for transmitting first information;
   means for providing at least a second carrier for transmitting second information;
   means for combining the first carrier and at least the second carrier into a multi-carrier signal;
   means for apportioning the transmission power for the multi-carrier signal between the first and second carriers according to a carrier priority; and
   means for transmitting the multi-carrier signal at a power no greater than the maximum amount, wherein the carrier priority allocates to the first carrier a first carrier portion of the transmission power, and allocates to the second carrier a second carrier portion of the transmission power, the second carrier portion being based on the power available for the multi-carrier signal reduced by the first carrier portion.

19. The transmitter of claim 18, wherein the terminal has an operational mode indicating whether or not the first carrier is in an active state, wherein the carrier priority includes means for allocating the first carrier portion if the first carrier is in an active state.

20. The transmitter of claim 19, wherein the carrier priority further includes means for allocating the second carrier portion if the second carrier is in an active state.

21. The transmitter of claim 20, further comprising means for limiting the power available for the multi-carrier signal to a maximum value.

* * * * *